United States Patent
Horn et al.

(10) Patent No.: US 10,533,488 B2
(45) Date of Patent: Jan. 14, 2020

(54) CONTROLLING A PUMP CONVEYING A COOLANT IN A CHARGING GAS COOLING CIRCUIT

(71) Applicant: VOLKSWAGEN AKTIENGESELLSCHAFT, Wolfsburg (DE)

(72) Inventors: Hauke Horn, Peine (DE); Jan Egermann, Gifhorn (DE); Dieter Mannigel, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 15/768,074

(22) PCT Filed: Oct. 14, 2016

(86) PCT No.: PCT/EP2016/074813
§ 371 (c)(1),
(2) Date: Apr. 13, 2018

(87) PCT Pub. No.: WO2017/064307
PCT Pub. Date: Apr. 20, 2017

(65) Prior Publication Data
US 2018/0306100 A1 Oct. 25, 2018

(30) Foreign Application Priority Data

Oct. 15, 2015 (DE) .................. 10 2015 117 592

(51) Int. Cl.
*F02B 29/04* (2006.01)
*F02D 41/00* (2006.01)

(52) U.S. Cl.
CPC ...... *F02B 29/0443* (2013.01); *F02B 29/0493* (2013.01); *F02D 41/0007* (2013.01);
(Continued)

(58) Field of Classification Search
CPC .............. F02B 29/0443; F02B 29/0493; F02D 2200/0414; F02D 2200/0416; F02D 2041/0067; F02D 41/0072; F02D 41/0007
See application file for complete search history.

(56) References Cited

U.S. PATENT DOCUMENTS

| | | | |
|---|---|---|---|
| 2006/0005790 A1 | 1/2006 | Braun et al. | |
| 2014/0251239 A1 | 9/2014 | Richards et al. | |
| 2015/0345432 A1 | 12/2015 | De La Morena et al. | |

FOREIGN PATENT DOCUMENTS

| | | |
|---|---|---|
| DE | 197 19 792 A1 | 11/1998 |
| DE | 198 34 135 A1 | 2/2000 |

(Continued)

OTHER PUBLICATIONS

International Search Report of PCT Application No. PCT/EP2016/074813, dated Feb. 2, 2017.
(Continued)

*Primary Examiner* — Jacob M Amick
(74) *Attorney, Agent, or Firm* — Pearl Cohen Zedek Latzer Baratz LLP

(57) ABSTRACT

The invention describes is a method (27) for controlling a coolant-conveying pump (7) in a charge gas cooling circuit (3) in order to cool a charge gas (9) for an internal combustion engine, whereby the method involves: maintaining (29) an inlet temperature (51) of the charge gas (9) in a heat exchanger (13) that is configured to exchange heat between the charge gas (9) and the coolant; ascertaining (31) a target cooling output (21) on the basis of the inlet temperature (51, T21) of the charge gas (9) and on the basis of a target outlet temperature (T22$_{target}$) of the charge gas (15) coming from the heat exchanger (13); determining (33) a change (23) of the target cooling output (21) over time, and providing (35) an actuation signal (25) for the pump (7) based on the target (Continued)

cooling output (21) and on the change (23) of the target cooling output over time.

11 Claims, 3 Drawing Sheets

(52) U.S. Cl.
CPC .. *F02D 41/0072* (2013.01); *F02D 2041/0067* (2013.01); *F02D 2200/0414* (2013.01); *Y02T 10/144* (2013.01); *Y02T 10/146* (2013.01); *Y02T 10/47* (2013.01)

(56) References Cited

FOREIGN PATENT DOCUMENTS

| | | | |
|---|---|---|---|
| DE | 102 24 063 A1 | 12/2003 | |
| DE | 10 2007 056 360 A1 | 6/2009 | |
| DE | 10 2009 006 966 A1 | 8/2010 | |
| DE | 10 2010 048 997 A1 | 5/2011 | |
| DE | 10 2011 011 822 A1 | 7/2012 | |
| DE | 102011011822 A1 * | 7/2012 | .......... F02B 29/0443 |
| DE | 10 2014 203 985 A1 | 9/2014 | |
| DE | 10 2015 216 420 A1 | 3/2016 | |

OTHER PUBLICATIONS

Search report for German Patent Application No. 10 2015 117 592.4, dated Jun. 3, 2016.

* cited by examiner

CONTROLLING A PUMP CONVEYING A COOLANT IN A CHARGING GAS COOLING CIRCUIT

CROSS-REFERENCE TO RELATED APPLICATIONS

This application is a National Phase Application of PCT International Application No. PCT/EP2016/074813, International Filing Date Oct. 14, 2016, claiming priority of German Patent Application No. 10 2015 117 592.4, filed Oct. 15, 2015, which is hereby incorporated by reference.

FIELD OF THE INVENTION

The present invention relates to a method and to a device for controlling a coolant-conveying pump in a charge gas cooling circuit in order to cool a charge gas for an internal combustion engine.

BACKGROUND OF THE INVENTION

In order to burn fuel in an internal combustion engine, a gas, for example, (compressed) air, and optionally also exhaust gas, is fed to a combustion chamber (e.g. to one or more cylinders) of the internal combustion engine. The gas that is fed to the internal combustion engine for purposes of burning the fuel will also be referred to below as charge gas, and it can contain air, especially compressed air, as well as exhaust gas. In order to achieve a high degree of combustion, it can be advantageous to keep the temperature of the charge gas below a certain level so as to achieve a certain threshold density of the charge gas. Due to the environmental influences and/or due to the exhaust gas that has been admixed to the charge gas, the temperature of the charge gas can vary markedly, rapidly fluctuating, for instance, within a range from 50 milliseconds to 0.5 seconds by a factor of between 2 and 10, particularly depending on the required driving torque and/or on the driving output.

In order to suitably cool the charge gas before it is fed into the combustion chamber of the internal combustion engine, the state of the art makes use of a charge gas cooling system. In this context, a coolant that is conveyed by a pump flows through a heat exchanger around which the charge gas flows, and the coolant then flows through a vehicle cooler, especially a low-temperature cooler, for purposes of cooling the coolant.

It has been noted that, in conventional charge air cooling systems, the gas that flows out after the heat exchange with the heat exchanger can reach relatively high temperatures, particularly in the case of highly fluctuating demands in terms of the driving output. In this process, the coolant might even come to a boil at the outlet of the charge air cooler.

In order to alleviate this problem, the state of the art makes use of a model-based feedforward control, including a PID (proportional-integral-derivative) controller.

The conventionally executed methods, however, typically only attain a slow and late correction of the cooling, which can cause the coolant to come to a boil or boil dry, especially in dynamic load ranges, that is to say, rapid and highly fluctuating demands in terms of the driving output. In some cases, the state of the art dispenses with monitoring the intake pipe temperature and/or with regulating the intake pipe temperature.

Due to the excessively high temperature of the charge air, the combustion inside the combustion chambers of the internal combustion engine cannot be optimally carried out and/or controlled under all conditions. In EGR (exhaust gas recirculation) concepts, if the charge air temperature is too low, the temperature can fall below the dew point, causing sooting of the charge gas cooler. For this reason, the coolant pump is used to regulate the value to empirically ascertained target temperatures for the charge gas.

SUMMARY OF THE INVENTION

Before this backdrop, one objective of the present invention is to put forward a method and a device for controlling a coolant-conveying pump in a charge gas cooling circuit in order to cool a charge gas for an internal combustion engine, whereby in particular, the temperature of the charge gas can be set more precisely than is presently possible in the state of the art.

This objective is achieved by the method and by the device according to the independent claims. The dependent claims specify special embodiments of the present invention.

According to one aspect of the present invention, a method for controlling a coolant-conveying pump in a charge gas cooling circuit in order to cool a charge gas for an internal combustion engine is being put forward. In this context, the method involves:

maintaining an inlet temperature of the charge gas in a heat exchanger that is configured to exchange heat between the charge gas and the coolant (a conceivable implementation of this can also be based purely on the mass flow);

ascertaining a target cooling output on the basis of the inlet temperature of the charge gas and on the basis of a target outlet temperature of the charge gas coming from the heat exchanger;

determining a change of the target cooling output over time; and providing an actuation signal for the pump based on the target cooling output and on the change of the target cooling output over time.

The method can be implemented by means of hardware and/or software. In particular, the method can be implemented by a computer program that can be loaded onto a processor and then executed. The coolant can especially be a conventional liquid coolant. On the basis of the actuation signal, the conveying capacity of the pump (e.g., the mass flow of the coolant) can be controlled. The actuation signal can be, for example, an electric and/or visual and/or mechanical signal. The charge gas cooling circuit can have several line sections, which do not necessarily have to be circular in shape but rather, can have any desired geometry, for instance, the charge gas cooling circuit can have straight sections and/or curved sections.

The charge gas can be ambient air and/or compressed (by a turbocharger) ambient air and/or exhaust gas emitted by the internal combustion engine. The inlet temperature of the charge gas in the heat exchanger can be considered as the temperature of the charge gas before it has entered the heat exchanger. The inlet temperature can be measured, determined by means of simulation or estimated in some other manner. The heat exchanger can have a network of lines with a large (internal and external) surface area, whereby the charge gas is conveyed past the surface of the line system and/or line network in order to exchange heat, and whereby the coolant flows inside the charge gas cooling circuit in the line system.

The determination of the target cooling output can involve arithmetic and/or logic operations which take into account the inlet temperature of the charge gas as well as the target outlet temperature of the charge gas. The target outlet temperature of the charge gas can have a permanently set and/or varying value. The target outlet temperature can be selected in such a way as to ensure the optimal combustion of fuel inside the combustion chambers of the internal combustion engine. The target cooling output can generally be determined on the basis of $Q'=m_f c_p \Delta T$, wherein $m_f$ is the mass flow, $c_p$ is the specific heat capacity of the gas and $\Delta T$ is the temperature differential between the inlet temperature of the gas and the target outlet temperature of the charge gas.

During the operation of the vehicle with the internal combustion engine, the inlet temperature of the charge gas can undergo marked and rapid fluctuations. Moreover, the charge gas mass flow can also undergo marked fluctuations during the operation of the internal combustion engine that powers the vehicle. In particular, the target cooling output can also be determined and/or ascertained especially on the basis of the charge gas mass flow that is conveyed through the heat exchanger for purposes of the heat exchange. The target cooling output can be determined as a continuous (analog) signal or else as a digital (discrete) signal. The inlet temperature can be obtained as a continuous (analog) or digital (discrete) signal as a function of the time. The change of the target cooling output over time can be ascertained by means of an analog circuit or of a digital circuit. In particular, a time curve of the inlet temperature can be obtained and a time curve of the target cooling output can be ascertained on the basis of the time curve of the inlet temperature and on the basis of a (e.g. constant) target outlet temperature. The change of the target cooling output over time can likewise be determined from the ascertained time curve of the target cooling output. The coolant can be effectively prevented from boiling dry in the charge gas cooling circuit by taking into consideration the change of the target cooling output over time (in addition to taking the target cooling output into consideration) in order to provide the actuation signal for the pump. In order to prevent the coolant from boiling dry, according to one embodiment of the present invention, the duty factor of the pump can be increased at an early point in time, in other words, the conveying capacity of the pump can be slightly increased.

In this manner, through the use of the proposed method, it is possible to prevent overheating of the coolant, so that the internal combustion engine can be operated more effectively under all environmental conditions.

The provision of an actuation signal can involve generating a square wave signal whose duty factor is ascertained on the basis of the target cooling output and on the basis of the change of the target cooling output over time. The pump can be switched on and off alternatingly by means of the square wave signal in order to set the conveying capacity of the pump. In this process, the duty factor can fluctuate between 0% and 100%, whereby a duty factor of 100% can correspond to the continuous operation of the pump while a duty factor of 0% can correspond to the pump being switched off, so that no coolant is being conveyed. This makes it possible for commonly available pumps to be controlled by means of the actuation signal.

The determination of the change of the target cooling output over time can involve ascertaining a first target cooling output as well as a second target cooling output that have a time interval between, for example, 10 ms and 500 ms. In other embodiments, the target cooling output can be continuously determined in the form of an analog or digital signal. Moreover, the method can involve determining the difference between the first target cooling output and the second target cooling output. In this manner, the methodology for ascertaining the change of the target cooling output over time is easy to carry out, thus simplifying the implementation of the method.

The determination of the change of the target cooling output over time can also involve forming a quotient from the difference and the time interval. Therefore, a differential quotient that can be a good indicator of the change of the target cooling output over time can be ascertained in a discrete manner.

The provision of the actuation signal can also involve determining the time curve of the change of the target cooling output over time. This time curve of the change of the target cooling output over time can, in turn, be based on a time curve of the target cooling output that was previously obtained or ascertained. This makes it possible to determine a (time) sequence of changes of the target cooling output over time, whereby this time curve can exhibit a noise (for example, due to determination artefacts or measuring artefacts). Low-pass filtering can reduce the noise in the time curve of the change of the target cooling output over time, thus improving the robustness of the method. The curve of the change of the target cooling output over time can also be low-pass filtered so that a filtered time derivation of the target cooling output can be obtained. The amplitude of high frequencies (rapid changes over time) of the curve of the change of the target cooling output over time can be reduced during the low-pass filtering. A time constant of the low-pass filtering can be selected as a function of the specific application case and, depending on the ambient temperature, can range from 200 ms to 2000 ms.

The actuation signal can also be determined on the basis of the target cooling output and on the basis of the filtered change of the target cooling output over time. The actuation signal can thus be determined in a reliable manner. According to other embodiments of the invention, the target cooling output can also be low-pass filtered and the low-pass filtered target cooling output can be employed to determine the actuation signal. The target cooling output is normally filtered to a value of 500 ms.

The time interval (between the first target cooling output and the second target cooling output) and/or a cutoff frequency of the low-pass filtering can be set as a function of the ambient temperature. As a result, the actuation of the pump can also depend on the ambient temperature so as to further improve the reliability of the charge gas cooling.

The provision of the actuation signal can also involve:
determining a first signal on the basis of the target cooling output and on the basis of the ambient temperature or on the basis of the coolant temperature, whereby the first signal rises as the target cooling output increases;
determining a second signal by means of a PID controller on the basis of the difference between the target outlet temperature of the charge gas and the actual outlet temperature of the charge gas coming from the heat exchanger;
determining a third signal on the basis of the filtered change of the target cooling output over time; and
adding the first signal, the second signal and the third signal in order to obtain the actuation signal.

A first module of a control unit can determine the first signal, a second module can determine the second signal, and a third module can determine the third signal. The modules can be configured, for example, as various hardware and/or software modules or as hierarchies within a module. In particular, all three modules or hierarchies can receive the ambient temperature, the gas inlet temperature, a target outlet temperature value and a charge gas mass flow as the input quantities. The first signal can be determined, for instance, (essentially) proportionally to the target cooling output. The PID controller can comprise a proportional element, an integration element and a differential element, each of which receives the difference between the target outlet temperature of the charge gas and the actual outlet temperature of the charge gas. However, the PID controller does not necessarily have to contain the target cooling output or a quantity derived from it as the input quantity. Due to a distribution over various modules that emit the first signal, the second signal and the third signal, the maintenance of the method as well as the reliability of the method can be improved. The signals, in other words, the first signal, the second signal and the third signal, can comprise, for instance, electric and/or visual signals. An arithmetic-logic unit (ALU) can be used to carry out the method.

Furthermore, the determination of the third signal can be based on the ambient temperature, whereby the amplitude of the third signal at negative ambient temperatures and/or at ambient temperatures above 30° C. is increased to a lesser extent than in the case of ambient temperatures between 0° C. and 20° C. This allows an effective correction of the amplitude to be made and, especially at ambient temperatures between 0° C. and 20° C., the third signal can have a greater weight relative to the first signal and the second signal. The risk of the coolant overheating or boiling dry can be greater precisely in the temperature range between 0° C. and 20° C. This risk can be diminished by attributing a greater value to the third signal in this ambient temperature range.

Moreover, the determination of the target cooling output can be based on the mass flow of the charge gas. The mass flow can be defined as the mass (or, for instance, the number of particles) of charge gas per unit of time that flows through the heat exchanger. The mass flow can also be ascertained (measured, simulated or estimated) in a time curve. The mass flow of the charge gas can be subject to marked time-related fluctuations because of the dynamic demands in terms of the driving output. Consequently, the charge gas mass flow can have a considerable effect on the temperature of the coolant. However, the coolant can be kept within the desired temperature range by taking into consideration the gas mass flow when actuating the pump.

It should be pointed out that features that are explained, described or employed in conjunction with a method for controlling a coolant-conveying pump in a charge gas cooling circuit in order to cool a charge gas for an internal combustion engine can likewise be employed, used or provided according to embodiments of the present invention for a device for controlling a coolant-conveying pump in a charge gas cooling circuit in order to cool a charge gas for an internal combustion engine, and vice versa.

According to another aspect of the present invention, a device for controlling a coolant-conveying pump in a charge gas cooling circuit in order to cool a charge gas for an internal combustion engine is being put forward, whereby the device is configured to carry out a method according to one of the preceding embodiments.

The device can be installed in an engine control unit, for example, in the form of a software module and/or a hardware module.

DETAILED DESCRIPTION OF THE INVENTION

Figure 1:
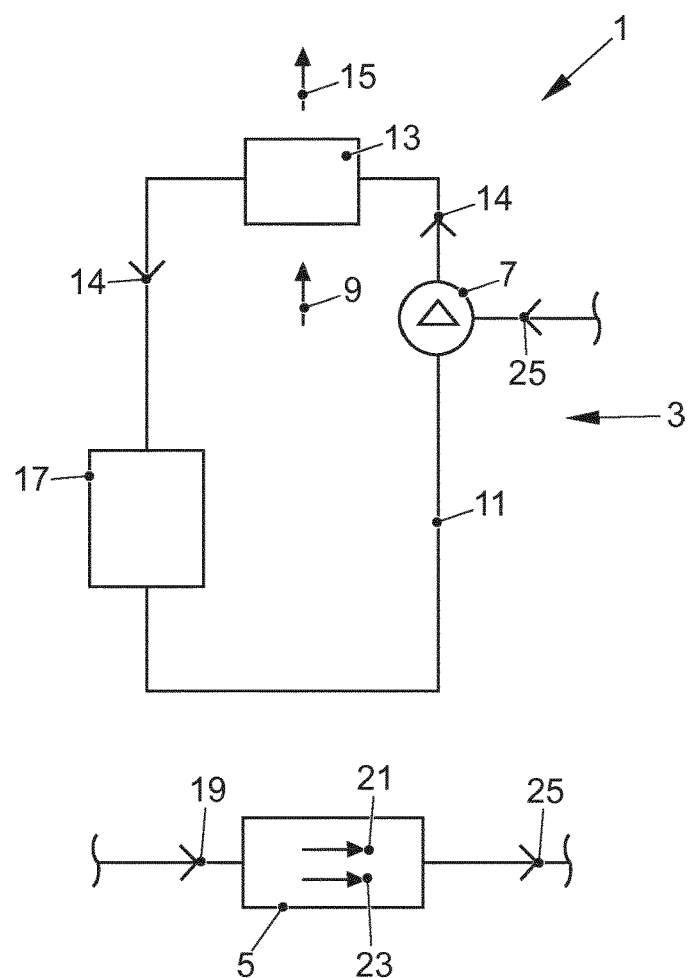
FIG. 1 schematically illustrates a charge gas cooling circuit having a device for controlling a coolant-conveying pump in the charge gas cooling circuit according to an embodiment of the present invention, which is configured to carry out a method according to an embodiment of the present invention.

The charge gas cooling system 1 schematically shown in FIG. 1 comprises a charge gas cooling circuit 3 and a device 5 for controlling a coolant-conveying pump 7 in the charge gas cooling circuit 3 in order to cool a charge gas 9 for an internal combustion engine according to an embodiment of the present invention, whereby the device 5 is configured to carry out a method for controlling a coolant-conveying pump in a charge gas cooling circuit according to an embodiment of the present invention.

The charge gas cooling circuit 3 comprises several line sections 11 in which a coolant can be conveyed in a conveying direction 14 by means of the pump 7. The conveying direction 14 can also run in the opposite direction. The charge gas cooling circuit 3 comprises a heat exchanger 13 with a line system (not depicted in detail here) in which the coolant can be conveyed. The line system of the heat exchanger 13 has a relatively large external surface area over which the (uncooled) charge gas 9 can be conveyed for purposes of heat exchange so as to yield a cooled charge gas 15, whereby some of the heat contained in the uncooled charge gas 9 is released to the coolant that is flowing through the heat exchanger 13. The coolant is further conveyed through a low-temperature cooler 17 in which, in turn, some of its heat can be released to the environment via the low-temperature cooler 17.

The device 5 receives a signal 19 that indicates an inlet temperature T21 of the charge gas 9 in the heat exchanger 13. Moreover, the device 5 ascertains a target cooling output 21 on the basis of the inlet temperature T21 of the charge gas 9, a target outlet temperature $T22_{target}$ of the charge gas 15 coming from the heat exchanger 13, and the gas mass flow of the charge gas 9. Furthermore, the device determines a change of the target cooling output over time (especially filtered), which is designated by the reference numeral 23. Based on the target cooling output 21 and the change 23 of the target cooling output over time, the device 5 provides an actuation signal 25 for the pump 7 so that the conveying capacity of the pump 7 can be controlled.

Figure 2:
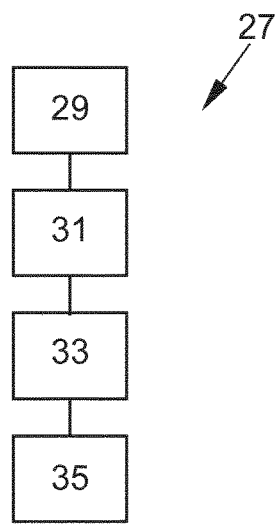
FIG. 2 schematically illustrates the carrying out of a method according to an embodiment of the present invention.

The method 24 carried out by the device 5 is shown in the form of a block diagram in FIG. 2. In a method step 29, the method involves maintaining the inlet temperature of the charge gas in a heat exchanger that is configured to exchange heat between the charge gas and the coolant. In a method step 31, the method involves determining a target cooling output on the basis of the inlet temperature of the charge gas and on the basis of the target outlet temperature ($T22_{target}$) of the charge gas coming from the heat exchanger. In a method step 33, the method involves determining a change of the target cooling output over time, and in a method step 35, the method involves providing an actuation signal for the pump on the basis of the target cooling output and on the basis of the change of the target cooling output over time.

In order to prevent the coolant of the charge gas cooling circuit 3 from overheating as well as from boiling dry, the pump duty factor of the actuation signal 25 for the pump 7 has to be raised at the earliest point in time. According to an embodiment of the present invention, the pump duty factor is raised by means of the filtered derivation of the target cooling output 21. In this manner, the filtered time-related derivation of the target cooling output can define the pump duty factor, especially the actuation signal 25.

Figure 3:
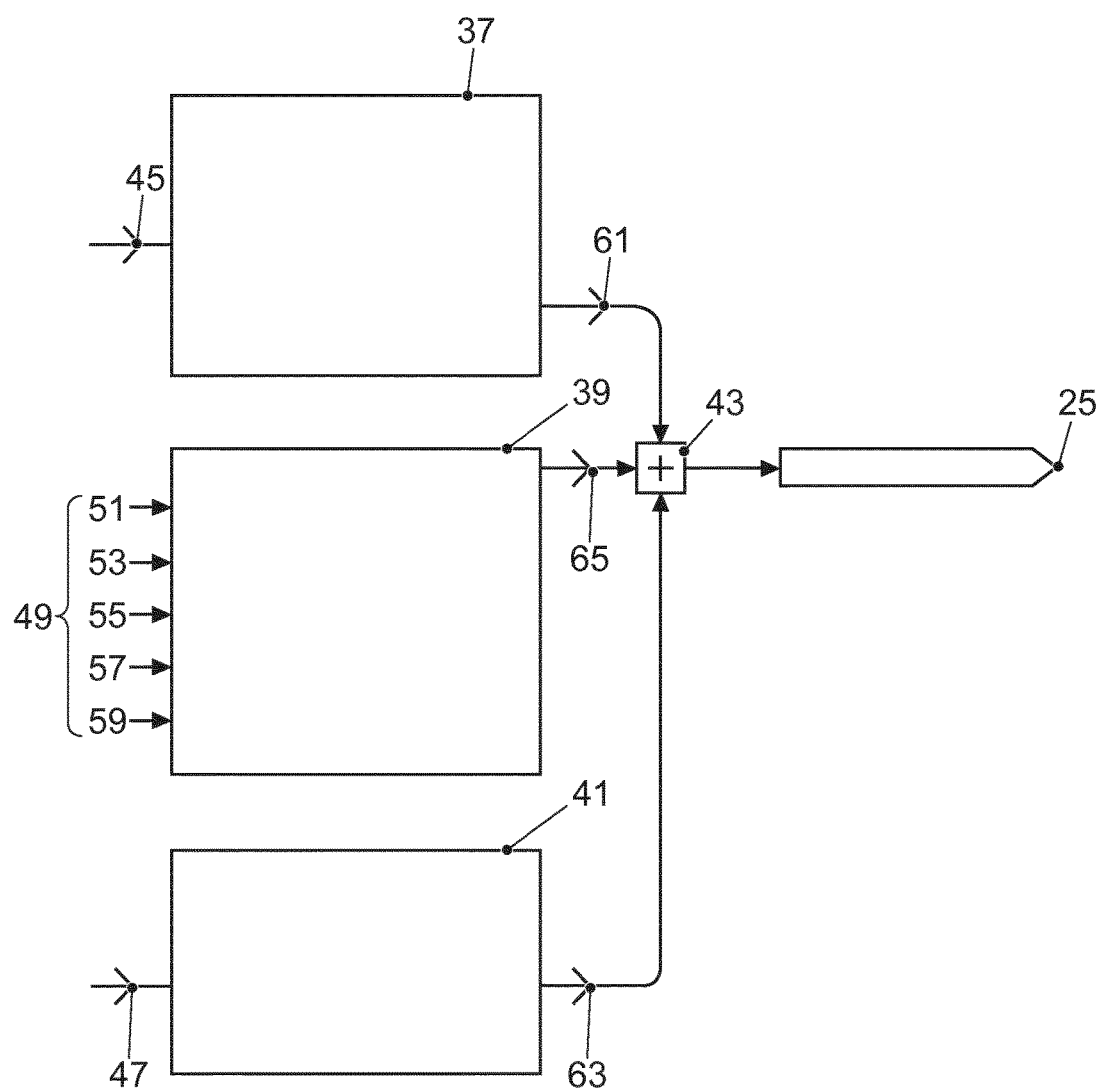
FIG. 3 schematically illustrates modules of a method for controlling a coolant-conveying pump in a charge gas cooling circuit according to an embodiment of the present invention.

The device 5 can comprise the modules that are schematically illustrated in FIG. 3 (e.g. software and/or hardware modules 37, 39 and 41) as well as the addition element 43. The feedforward control module 37 receives input signals 45, the control module 41 receives input signals 47 and the correction module 39 receives input signals 49. In particular, the input signals 45, 47 and 49 can be similar or identical input signals. The input signals 49 especially are a signal 51 of the inlet temperature of the charge gas 9, a signal 53 of the target outlet temperature ($T22_{target}$) of the charge gas 15 coming from the heat exchanger 13, a signal 55 of the gas mass flow of the charge gas 9 or 15, a signal 57 of a correction (for example, of the T22 control deviation or of the temperature differential between the ambient temperature and $T22_{target}$) as well as a signal 59 of an ambient air temperature.

The feedforward control module 37 can also receive a target cooling output as the input signal. In particular, the control module 41 can have a PID controller which determines an output signal in such a way that the difference between the target outlet temperature ($T22_{target}$) and the actual outlet temperature (T22) of the charge gas 15 becomes minimal.

On the basis of the target cooling output 21 and on the basis of an ambient temperature (known from signal 59), the feedforward control module ascertains a first signal 61 which rises especially as the target cooling output 21 increases. The control module 41 determines a second signal 63 on the basis of the difference between the target outlet temperature ($T22_{target}$) of the charge gas 15 and the actual outlet temperature (T22) of the charge gas 15 coming from the heat exchanger 13. The correction module 39 determines a third signal 65 on the basis of the filtered change 23 of the target cooling output 21 over time. The first signal 61, the second signal 63 and the third signal 65 are added by means of the addition element 43 in order to obtain the actuation signal 25 that is then supplied to the pump 7.

Figure 4:
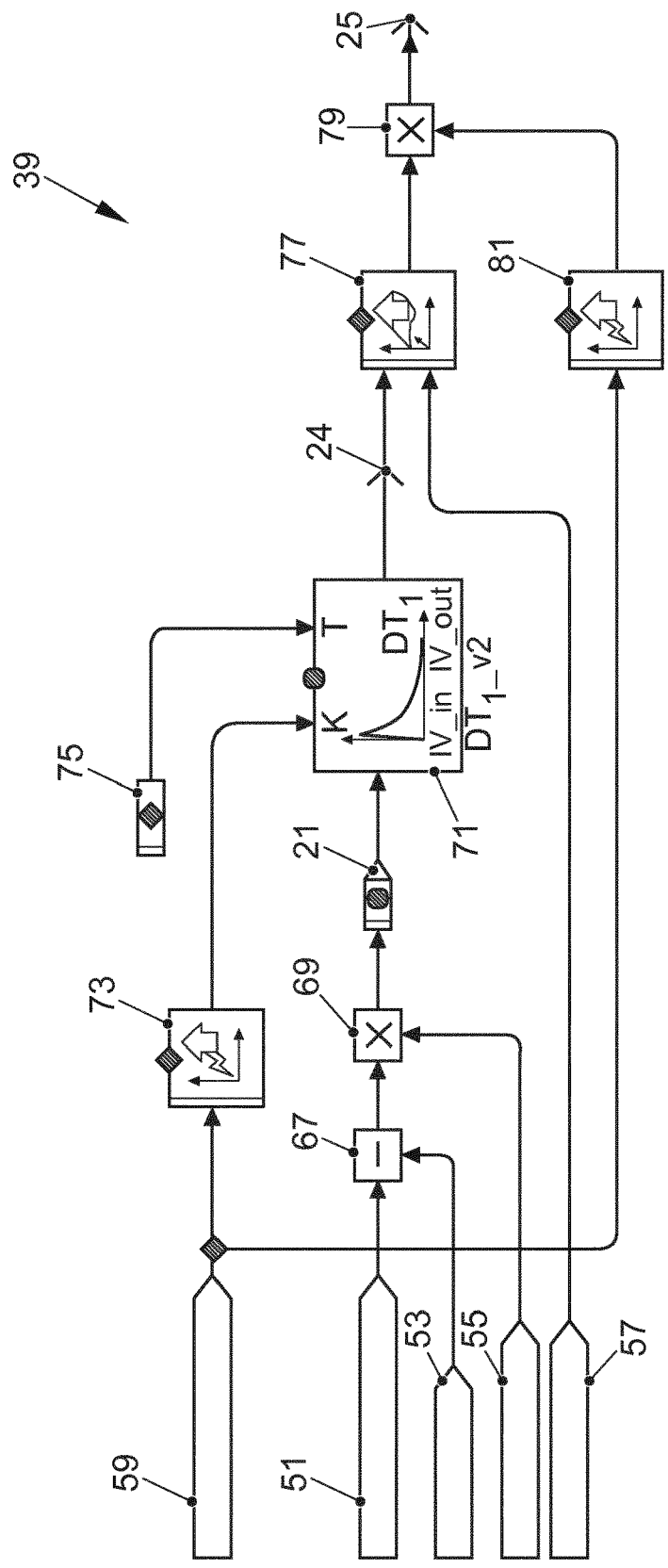
FIG. 4 schematically illustrates a module that is used in a method for controlling a coolant-conveying pump in a charge gas cooling circuit according to an embodiment of the present invention.

FIG. 4 schematically illustrates an embodiment of the correction module 39 which (e.g. together with the modules 37 and 41) can be present in the device 5.

A subtraction element 67 subtracts a target outlet temperature (signal 53, $T22_{target}$) from an input signal 51 of the inlet temperature of the charge gas 9. A multiplication element 69 multiplies the result by a signal 55 of the gas mass flow. The result of the multiplication is the target cooling output 21. The derivation and filtering module 71 determines a filtered time derivation 24 of the target cooling output from the target cooling output 21, especially from a time curve of the target cooling output, or else from a sequence of target cooling outputs that correspond to several points in time. For this purpose, the processing module 71 receives as input a corrected signal 59 of the ambient temperature that has been corrected by means of a dynamic correction 73. Moreover, the derivation and filtering module 71 receives as input additional parameters 75 for the configuration of the derivation and filtering module 71. Like the dynamic correction 73, the parameters 75 can vary as a function of the ambient temperature. The filtered change 24 of the target cooling output 21 over time is entered together with the signal 57 of a correction factor into the basic engine characteristic map 77 which essentially undertakes a one-dimensional mapping from the filtered change 24 of the target cooling output 21 over time and from the correction input 57. The product from the basic engine characteristic map 77 is multiplied by means of a multiplication element 79 with the signal 59 of the ambient temperature after it has been modified by an amplitude correction element 81. In FIG. 3, the product from the multiplication element 79 represents the pump actuation signal 25 or the addition element 65.

The heat exchanger 13 can be an intake pipe-integrated charge air cooler. The inlet temperature (signal 51) of the charge gas 9 does not have to be measured, but rather, it can be estimated or determined through simulation. The conveying pump 7 can also be gradient-limited so that a change of the conveying capacity of the conveying pump 7 is kept below a gradient threshold. The inlet temperature T21 of the charge gas can be, for example, between 180° C. and 100° C. The target outlet temperature $T22_{target}$ can be, for instance, between 10° C. and 55° C., especially approximately 45° C. The maximum temperature of the coolant before it simmers or boils can be about 130° C. The gas mass flow (signal 55) can vary by a factor of up to 10 within 100 ms, for example, in a dynamic driving range. According to an embodiment of the present invention, the temperature of the coolant does not have to be measured directly, but rather, it is estimated on the basis of the ambient temperature.

LIST OF REFERENCE NUMERALS 1 charge gas cooling system
3 charge gas cooling circuit
5 device for controlling the coolant conveying pump
7 coolant conveying pump
9 incoming charge gas
11 line sections
13 heat exchanger
14 conveying direction (can also run in the opposite direction)
15 outgoing charge gas
17 low-temperature cooler
19 signal of the gas inlet temperature
21 target cooling output
23 change of the target cooling output over time
24 filtered change of the target cooling output over time
24 actuation signal for the conveying pump
27 method
29, 31, 33, 35 method steps
37 first module
41 second module
39 third module
43 addition element
45, 47, 49 input signals
51 signal of the inlet temperature of the charge gas
53 signal of the target outlet temperature
55 signal of the charge gas mass flow
57 signal of a correction
59 signal of the ambient temperature
61 first signal
63 second signal
65 third signal 67 subtraction element
69 multiplication element
71 filtering and derivation module
73 dynamic correction
75 input parameter
77 basic engine characteristic map
70 multiplication element
81 amplitude correction

The invention claimed is:

1. A method for controlling a coolant-conveying pump in a charge gas cooling circuit in order to cool a charge gas for an internal combustion engine, whereby the method comprises:
    maintaining an inlet temperature of the charge gas in a heat exchanger that is configured to exchange heat between the charge gas and the coolant;
    ascertaining a target cooling output on the basis of the inlet temperature of the charge gas and on the basis of a target outlet temperature of the charge gas coming from the heat exchanger;
    determining a change of the target cooling output over time; and
    providing an actuation signal for the pump based on the target cooling output and on the change of the target cooling output over time.

2. The method according to claim 1, whereby providing the actuation signal involves generating a square wave signal whose duty factor is ascertained on the basis of the target cooling output and on the basis of the change of the target cooling output over time.

3. The method according to claim 1, whereby determining the change of the target cooling output over time comprises:
    ascertaining a first target cooling output as well as a second target cooling output that have a time interval between 10 ms and 500 ms; and
    determining the difference between the first target cooling output and the second target cooling output.

4. The method according to claim 3, whereby determining the change of the target cooling output over time comprises:
    forming a quotient from the difference and the time interval.

5. The method according to claim 1, whereby providing the actuation signal comprises:
    determining the time curve of the change of the target cooling output over time;
    low-pass filtering of the curve of the change of the target cooling output over time so that a filtered change of the target cooling output over time can be obtained; and
    determining the actuation signal on the basis of the target cooling output and on the basis of the filtered change of the target cooling output over time.

6. The method according to claim 5, whereby the time interval and/or a cutoff frequency of the low-pass filtering is set as a function of the ambient temperature.

7. The method according to claim 6, whereby providing the actuation signal involves:
    determining a first signal on the basis of the target cooling output and on the basis of the ambient temperature or on the basis of the coolant temperature, whereby the first signal rises as the target cooling output increases;
    determining a second signal by means of a PID controller on the basis of the difference between the target outlet temperature of the charge gas and the actual outlet temperature of the charge gas coming from the heat exchanger;
    determining a third signal on the basis of the filtered change of the target cooling output over time; and
    adding the first signal, the second signal and the third signal in order to obtain the actuation signal.

8. The method according to claim 7,
    whereby determining the third signal is also based on the ambient temperature, and
    whereby the amplitude of the third signal at negative ambient temperatures and/or at ambient temperatures above 30° C. is increased to a lesser extent than in the case of ambient temperatures between 0° C. and 20° C.

9. The method according to claim 1, whereby determining the target cooling output is also based on the mass flow of the charge gas.

10. A device for controlling a coolant-conveying pump in a charge gas cooling circuit in order to cool a charge gas for an internal combustion engine, whereby the device is configured to carry out a method according to claim 1.

11. The method according to claim 3, whereby the time interval and/or a cutoff frequency of the low-pass filtering is set as a function of the ambient temperature.

* * * * *